(12) United States Patent
Humphreys et al.

(10) Patent No.: US 7,860,775 B2
(45) Date of Patent: Dec. 28, 2010

(54) METHOD AND APPARATUS FOR INCREASING INVESTMENT RETURN AND ASSET LIQUIDITY

(75) Inventors: H. Brett Humphreys, Hastings-on-Hudson, NY (US); David Shimko, New York, NY (US)

(73) Assignee: Asset Deployment LLC, New York, NY (US)

(*) Notice: Subject to any disclaimer, the term of this patent is extended or adjusted under 35 U.S.C. 154(b) by 986 days.

(21) Appl. No.: 11/560,586

(22) Filed: Nov. 16, 2006

(65) Prior Publication Data

US 2008/0120245 A1     May 22, 2008

(51) Int. Cl.
*G06Q 40/00*     (2006.01)
(52) U.S. Cl. .................................................. 705/36 R
(58) Field of Classification Search ............... 705/36 R
See application file for complete search history.

(56) References Cited

U.S. PATENT DOCUMENTS

| | | | |
|---|---|---|---|
| 4,346,442 A | 8/1982 | Musmanno | |
| 4,376,978 A | 3/1983 | Musmanno | |
| 4,718,009 A | 1/1988 | Cuervo | |
| 5,083,270 A | 1/1992 | Gross et al. | |
| 5,206,803 A | 4/1993 | Vitagliano et al. | |
| 5,262,942 A | 11/1993 | Earle | |
| 6,070,151 A | 5/2000 | Frankel | |
| 6,460,021 B1 | 10/2002 | Kirksey | |
| 6,513,020 B1 | 1/2003 | Weiss et al. | |
| 6,847,946 B2 * | 1/2005 | Blanz et al. ............... | 705/38 |
| 6,856,971 B1 | 2/2005 | Sperandeo | |
| 7,020,626 B1 | 3/2006 | Eng et al. | |

(Continued)

FOREIGN PATENT DOCUMENTS

JP      2002-169960      6/2002

(Continued)

OTHER PUBLICATIONS

Hawbaker, J.M: Ownership structures for your farm pr ranch: some basics considerations, University of Nebraska, Lincoln, Risk Management Workshop Series, pp. 1-19, http://www.cfra.org/files/BusinessStructure.pdf.*

(Continued)

*Primary Examiner*—Hani Kazimi
*Assistant Examiner*—Bijendra K Shrestha
(74) *Attorney, Agent, or Firm*—Jones Day; Brett Lovejoy; Arrienne Lezak

(57) ABSTRACT

Investment return on a liquid or illiquid asset is increased by granting the right to pledge the asset to an entity that can deploy the asset more efficiently than its owner. Using the committed assets—and the resulting ability of the entity to pledge those assets and borrow capital at advantageous rates—the entity can transact for greater profits than the asset owner could otherwise earn. The entity's credit rating may be based, at least in part, on a third-party guarantee of the asset's value. The credit rating may also be based on other characteristics of the entity. The entity may obtain pledges of multiple assets from multiple owners, all of whom share in the profits of the transactions. If there are losses, the pledged assets can be sold, or the owners can contribute to the entity to pay off the losses.

36 Claims, 5 Drawing Sheets

U.S. PATENT DOCUMENTS

| | | | |
|---|---|---|---|
| 7,096,194 B2 * | 8/2006 | Johnson .................. 705/35 |
| 7,099,843 B1 | 8/2006 | Cassidy et al. |
| 7,249,114 B2 * | 7/2007 | Burchetta et al. ............. 705/80 |
| 2002/0019793 A1 | 2/2002 | Frattalone |
| 2002/0077961 A1 * | 6/2002 | Eckert et al. .................. 705/37 |
| 2002/0116211 A1 | 8/2002 | Hatakeyama |
| 2002/0198817 A1 | 12/2002 | Dhir |
| 2004/0002908 A1 | 1/2004 | James |
| 2004/0006528 A1 | 1/2004 | Fung |
| 2004/0006529 A1 | 1/2004 | Fung |
| 2004/0019506 A1 | 1/2004 | Struchtemeyer |
| 2004/0054613 A1 * | 3/2004 | Dokken .................. 705/36 |
| 2004/0064391 A1 | 4/2004 | Lange |
| 2004/0093297 A1 * | 5/2004 | Strobel et al. ............... 705/36 |
| 2004/0153388 A1 * | 8/2004 | Fisher et al. ................ 705/36 |
| 2004/0177021 A1 | 9/2004 | Carlson et al. |
| 2004/0199440 A1 | 10/2004 | McDaniel, Jr. |
| 2005/0010481 A1 | 1/2005 | Lutnick et al. |
| 2005/0021434 A1 | 1/2005 | D'Loren |
| 2005/0044019 A1 | 2/2005 | Novick et al. |
| 2005/0108029 A1 | 5/2005 | Schneider |
| 2005/0131788 A1 | 6/2005 | Verdonik |
| 2005/0137957 A1 | 6/2005 | McDaniel, Jr. |
| 2005/0144045 A1 | 6/2005 | Corsi |
| 2005/0177473 A1 | 8/2005 | Angle |
| 2005/0187801 A1 | 8/2005 | Phelps |
| 2005/0203833 A1 | 9/2005 | Pembroke |
| 2005/0216316 A1 | 9/2005 | Brisbois et al. |
| 2005/0222927 A1 * | 10/2005 | Woodley .................. 705/35 |
| 2005/0289036 A1 | 12/2005 | LaCombe, Jr. et al. |
| 2006/0059084 A1 * | 3/2006 | Tucker .................. 705/38 |
| 2006/0080194 A1 | 4/2006 | Rachie |
| 2006/0080228 A1 | 4/2006 | McGill et al. |
| 2006/0095355 A1 | 5/2006 | Mayers et al. |
| 2006/0122930 A1 | 6/2006 | Jariwala |
| 2006/0143055 A1 | 6/2006 | Loy et al. |
| 2006/0184442 A1 | 8/2006 | Krasnerman et al. |
| 2006/0206417 A1 | 9/2006 | Selby |
| 2006/0212380 A1 | 9/2006 | Williams et al. |
| 2006/0229973 A1 | 10/2006 | Sternberg |
| 2006/0259419 A1 | 11/2006 | Monsen et al. |
| 2006/0271388 A1 | 11/2006 | Lecomte |
| 2007/0016520 A1 | 1/2007 | Gang et al. |
| 2007/0027787 A1 | 2/2007 | Tripp |
| 2007/0038533 A1 | 2/2007 | Huff |
| 2007/0179882 A1 | 8/2007 | Intrator |
| 2008/0097797 A1 * | 4/2008 | Morris et al. .................. 705/4 |
| 2008/0140582 A1 * | 6/2008 | Burchetta et al. ............. 705/80 |

FOREIGN PATENT DOCUMENTS

| | | |
|---|---|---|
| WO | WO 91/11772 | 8/1991 |
| WO | WO 00/75828 | 12/2000 |
| WO | WO 02/11026 | 2/2002 |
| WO | WO 03/052548 | 6/2003 |
| WO | WO 2004/066169 | 8/2004 |
| WO | WO2006/085867 | 8/2006 |

OTHER PUBLICATIONS

Daniel, J.S.: The LLC versus The S Corp, Criteria you can use to determine which is better for your new venture, Feb. 2006, Southeast Real Estate Business, pp. 1-2.*

Hawbaker, J.M: Ownership structures for your farm pr ranch: some basics considerations, University of Nebraska, Lincoln, Risk Management Workshop Series, pp. 1-19, http://www.cfra.org/files/BusinessStructure.pdf.*

Daniel, J.S.: The LLC versus The S Corp, Criteria you can use to determine which is better for your new venture, Feb. 2006, Southeast Real Estate Business, pp. 1-2.*

Society of Lloyd's, "The Lloyd's market," http://www.lloyds.com/About_Us/What_is_Lloyds/The_Lloyds_market.htm, (Oct. 30, 2006; accessed Nov. 9, 2006).

State of New York Banking Dept., "Fees and Interest Rates—Home Equity Lines of Credit," http://www.banking.state.ny.us/srvheloc.htm (accessed Nov. 9, 2006).

State of New York Banking Dept., "Fees and Interest Rates—Home Equity Loans," http://www.banking.state.ny.us/srvhel.htm (accessed Nov. 9, 2006).

* cited by examiner

METHOD AND APPARATUS FOR INCREASING INVESTMENT RETURN AND ASSET LIQUIDITY

BACKGROUND OF THE INVENTION

This invention relates to allowing owners of assets to increase their investment returns, including allowing owners of relatively illiquid assets to obtain a superior return on their equity in those assets. More particularly, the invention relates to method and apparatus for obtaining guarantees of the value of the owner's equity in assets in order to facilitate the use of those assets to generate investment returns or other economic benefits for the asset owners.

Owners of certain types of relatively illiquid assets may seek ways to put those assets to productive use. There are many known mechanisms through which an asset owner increase the liquidity of illiquid assets, freeing up the equity in those assets for productive use.

However, there are many assets whose equity is underutilized or not efficiently utilized. This is because the ways in which the owner of an asset can monetize his or her equity in the asset without selling it outright are generally limited by one or more of (a) the owner's own credit characteristics, (b) the existence, or not, of a market for lending against the particular type of asset, and (c) prevailing interest rates.

For example, owners of real estate (in addition to putting the land itself to productive agricultural, residential, or commercial use) commonly borrow against their property by way of a mortgage or a home equity line of credit.

However, no existing mechanism provides a flexible solution that can, on the one hand, be applied to a variety of assets and, on the other hand, facilitate a large number of potential uses for those assets in the marketplace on a more advantageous basis than the owner could achieve individually. Further, existing mechanisms fail to maximize the return to the asset owner or have other inherently undesirable characteristics.

Current methods for monetizing the owner's equity in an asset by borrowing against its value are inherently inefficient. For example, in exchange for a loan, the asset owner typically makes a payment or payments to the lender at a disadvantageous rate of interest. Consequently, any return that the owner may make from investing the borrowed money needs to be offset against the owner's liability to make a payment or payments of interest and principal to the lender at a premium rate relative to the risk to the assets. Further, the asset owner is rarely able to borrow funds representing more than a fraction of the value of the owner's total equity in the asset.

Again considering real property as an example of a relatively illiquid asset, home equity lines of credit or mortgage lending provide two well known methods of borrowing against an asset. Reverse mortgages are a further example of one such less-than-optimal borrowing mechanism for real property, as reverse mortgages likely result in the eventual loss of the pledged real property asset so that it will be unavailable to the owner's estate.

The insurance market known as Lloyd's of London provides a mechanism for "providers of capital" to earn a return on their property without borrowing against it, by instead using capital assets to underwrite potential insurance losses. In the Lloyd's market, individual or corporate members underwrite certain insurable risks. This is accomplished by the use of a variety of intermediaries, including brokers, recurring annual syndicates, the syndicates's managing agents, and members's agents, as well as the various corporations formed by the Lloyd's market to assist with the insurance functions of policy writing and claims management. Corporate insurers who participate in the Lloyd's market can avoid using many of these intermediaries by forming Integrated Lloyd's Vehicles, wherein many of the functions provided by agents are combined in a single entity under the insurer's control.

The Lloyd's market also benefits from certain oversight and risk management functions undertaken by Lloyd's of London itself, as overseen by the Council of Lloyd's. The peculiar structure and object of the Lloyd's market is governed by a United Kingdom statute, and the structure of the Lloyd's market has been altered from time to time by the Parliament of the United Kingdom. As such, Lloyd's has a unique structure which is inexorably linked to its particular object and history, to exist as a marketplace for insurance that connects providers of capital who wish to act as insurance underwriters with insurable risks through several layers of highly structured and unique intermediaries. The Lloyd's market does not increase the liquidity of its member's assets and its activity is limited to insurance.

It would be desirable to be able to provide a method and apparatus that would allow an asset owner to obtain a superior return on the asset owner's equity in the asset, regardless of the liquidity of the asset.

SUMMARY OF THE INVENTION

It is an object of the present invention to provide a method and apparatus that would allow an asset owner to obtain a superior return on the asset owner's equity in an asset, by pledging that asset to an investment vehicle that can deploy the asset and commit the value contained therein to a variety of uses and investments, typically on more advantageous terms than the owner could if the owner were acting alone.

It is another object of the present invention to make the previously under-utilized value represented by the owner's equity in various classes of assets available for a variety of additional productive uses, thereby allowing financial markets to operate with increased efficiency.

The above and other objects and advantages of the invention are realized in a preferred embodiment of the invention by creating a legal entity (referred to herein as a "vehicle"), transferring to the vehicle a right to pledge the asset, and obtaining a guarantee of the value of the asset. The guarantee may be presented subsequently to a commercial credit rating agency to obtain a credit rating for the vehicle. In reliance upon the credit rating thereby obtained, the vehicle may borrow money from a lender.

Because the vehicle has substantially no balance sheet characteristics other than the right to pledge the asset (and the liability to pay premiums in exchange for the guarantee or other fees associated with the structure) and benefits from an external guarantee of the value of the asset, if necessary, the vehicle can typically borrow on more advantageous terms than the asset owner could, thereby making a relatively illiquid asset more liquid. In particular, the portion of the value of the asset that can be borrowed against may be greater than the portion that could be borrowed against if the asset owner were borrowing on his or her own account. Moreover, the credit rating based on the guaranteed full value of the asset would be expected to allow the vehicle to borrow at a lower interest rate than that available to the asset owner.

By engaging the services of a knowledgeable manager, the vehicle can agree to commit all or part the value represented by the asset to transactions. In the normal course those transactions would be expected to provide returns for the asset owners. Such returns would be expected to exceed the returns available to the asset owner from previously known mechanisms such as those described above.

Preferably, the manager can have the vehicle engage in any type of transaction or investment. For example, the manager can have the vehicle act as a surety to guarantee the performance of a third party in an unrelated transaction, in which case it is not even necessary to borrow against the value of the asset except in the event that the third party defaults on its obligations in the unrelated transaction. In that way, interest expense is eliminated or minimized.

The vehicle can also borrow against the value of the asset for investment purposes or to pay fees and expenses in connection with its operations. In such a case, there may be borrowing against the asset over the life of the investment. If the asset in question is real estate, such borrowing may be similar to mortgage financing or a home equity line of credit secured by the asset, except that the vehicle is able to borrow at more advantageous interest rates—because of its investment grade credit rating—than would generally be available to the asset owner acting alone.

In practice, the operations of a vehicle in accordance with the present invention will likely involve some combination of transactions that require borrowing, and transactions that do not require borrowing.

In one preferred embodiment of the present invention, the vehicle has a number of desired characteristics commonly associated with arm's length counterparties, such as an investment grade credit rating, liquidity, and management expertise sufficient to decide to which uses to commit the assets. For example, the vehicle may be an entity that also has a separate business, such as a bank or investment management company. In another preferred embodiment of the invention, the vehicle may possess only some of those desired characteristics, with the balance of the desirable characteristics being created using arm's length counterparties. In either embodiment, the vehicle's investment grade credit rating may be solely the result of its having rights to borrow against one or more assets (owned by one or many owners). Alternatively, particularly in the first embodiment, the vehicle may have other characteristics separate from the pledged assets that earn it an investment grade credit rating. In this connection, it should be noted that a vehicle in the second embodiment that has control of a large number of pledged assets, particularly such an entity that has been operating for a time and therefore has accumulated profits from previous transactions, may have an investment grade credit rating of the type that would be expected for a vehicle according to the first embodiment.

Thus, in accordance with the present invention, there is provided a method for increasing return on an asset for its owner. The method includes obtaining from the owner, by an entity other than the owner, rights to pledge the asset, and entering, by the entity, into a transaction based on a pledge of the asset.

There is also provided a method for increasing return of a plurality of assets for owners of those assets. The method includes obtaining from each respective one of the owners, by an entity other than any of the owners, rights to pledge respective ones of the assets, and entering, by the entity, into a plurality of transactions, each of the transactions based on a pledge of at least one of the assets.

Apparatus for administering the method, and an investment product based on the method, are also provided.

BRIEF DESCRIPTION OF THE DRAWINGS

The above and other objects and advantages of the invention will be apparent upon consideration of the following detailed description, taken in conjunction with the accompanying drawings, in which like reference numerals refer to like parts throughout, and in which.

DETAILED DESCRIPTION OF THE INVENTION

The method according to the invention will now be described with reference to FIGS. 1-4.

Figure 1:
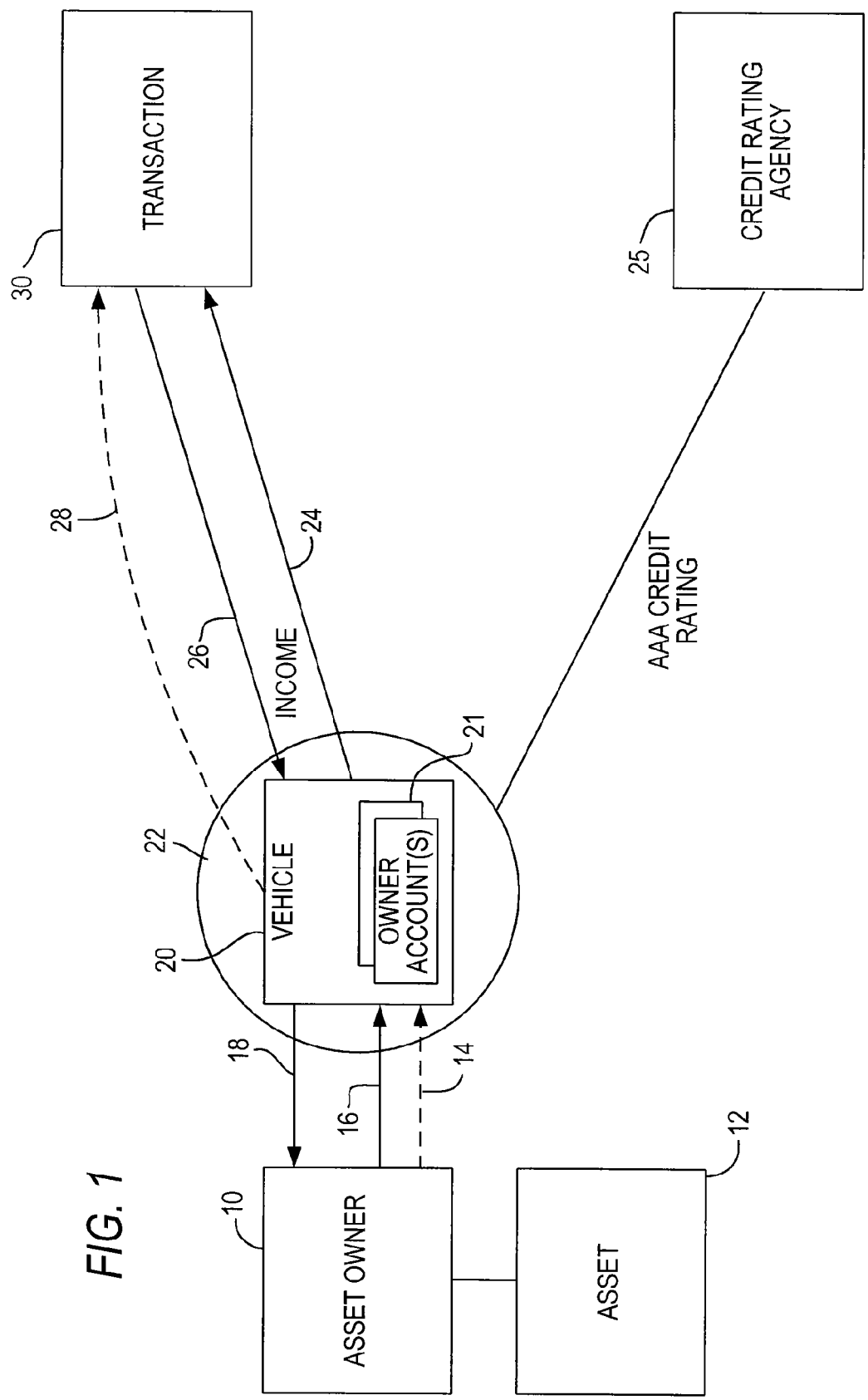
FIG. 1 is a schematic diagram of a first preferred embodiment of the present invention.

FIG. 1 shows an arrangement 100 according to a first preferred embodiment of a method according to the present invention. In arrangement 100, an asset owner 10 preferably provides to vehicle 20 an assignment 16 of the right to pledge the owner's asset 12. Vehicle 20 preferably has an investment grade credit rating 22 because of its pre-existing characteristics, which preferably are unrelated to the assignment 16. Those pre-existing characteristics may include the ability and willingness to repay debt as evidenced by, inter alia, the vehicle's financial history and balance sheet. In a case, as described above, where a vehicle according to a second preferred embodiment of the invention has operated successfully and accumulated sufficient profit to become creditworthy in its own right, the pre-existing characteristics may also include that prior history and creditworthiness.

Vehicle 20 preferably makes a commitment 24 to an investment 30, with the value of commitment 24 preferably not exceeding the realizable net cash value of asset 12 (or the aggregate realizable net cash value of a plurality of assets similar to asset 12 as discussed below). In exchange for the commitment 24 by vehicle 20, if the outcome of the investment is as expected, vehicle 20 preferably earns a return 26. From return 26, vehicle 20 preferably pays income 18 to asset owner 10, and also derives profit of its own (which may be a factor in securing credit rating 22).

If the outcome of transaction 30 is not as expected and there is a loss, vehicle 20 preferably is obligated to fund the amount of commitment 24. In that case, a payment 28 preferably is made by vehicle 20 to cover the loss. Vehicle 20 preferably then makes a "call" on asset owner 10—i.e., collects from asset owner 10 a payment 14 preferably equal to payment 28. However, if asset owner 10 has no independent means of funding payment 14, asset owner 10 may have to liquidate asset 12, which underlies the assignment 16 to vehicle 20. Preferably, the terms of assignment 16 give vehicle 20 the right to liquidate asset 12, if such liquidation is necessary to fund required payment 14 to vehicle 20.

For purposes of clarity, arrangement 100 as depicted in FIG. 1 involves only one asset 12 owned by one asset owner 10, securing one transaction 30. However, this embodiment of the invention may operate with a plurality of assets, asset owners, and/or transactions.

Figure 2:
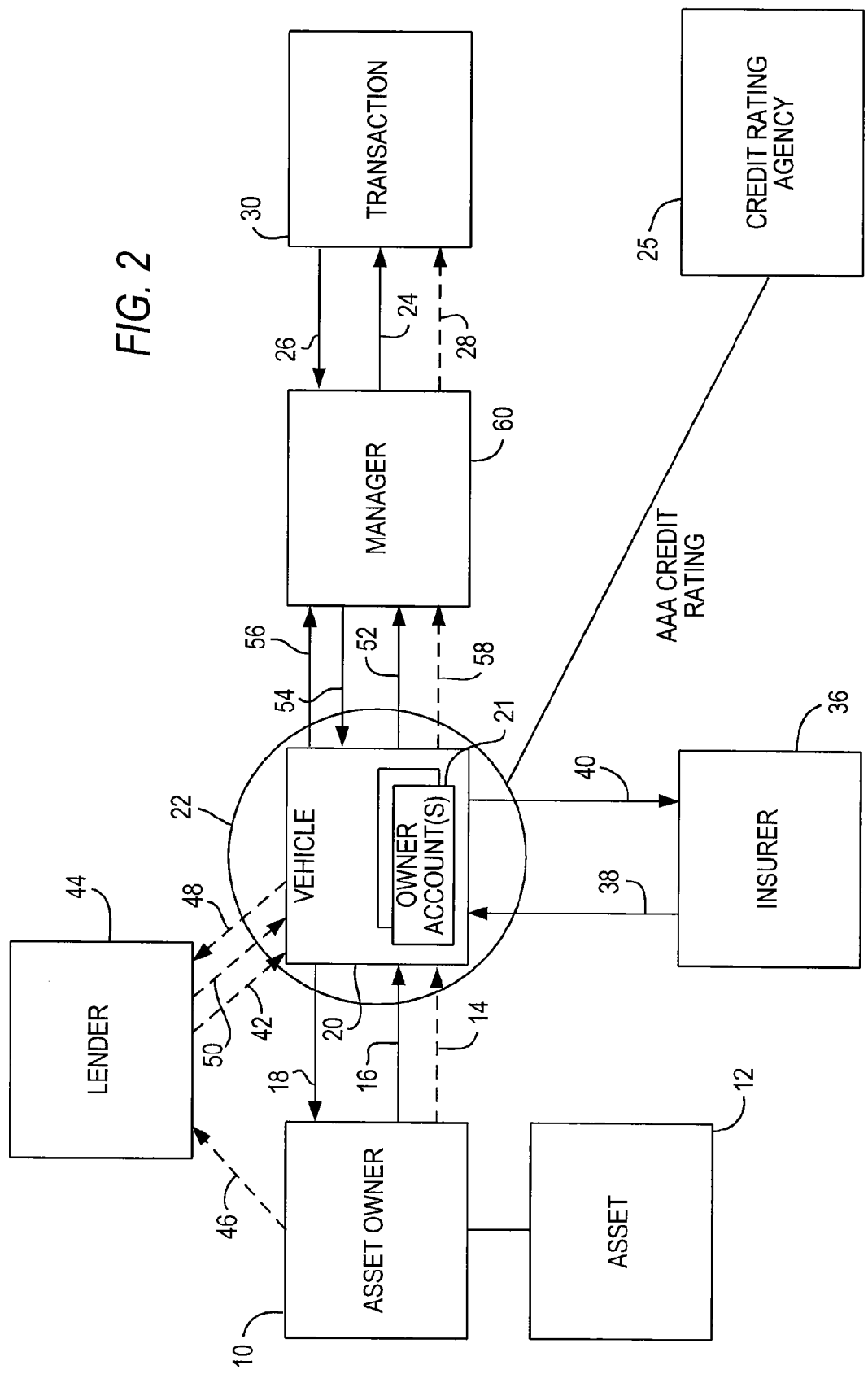
FIG. 2 is a schematic diagram of a second preferred embodiment of the present invention.

FIG. 2 shows an arrangement 200 according to a second preferred embodiment of a method according to the present invention. As in arrangement 100, in arrangement 200 asset owner 10 preferably provides to vehicle 20 an assignment 16 of the right to pledge the owner's asset 12. In this embodiment of the invention, vehicle 20 may have no pre-existing credit characteristics, other obligations, or assets besides assignment 16 from asset owner 10. Vehicle 20 preferably subsequently contracts with an insurer 36 to provide a guarantee 38 of the value of asset 12 in exchange for the payment of premiums 40 by vehicle 20. Insurer 36 satisfies itself—e.g., through its own appraisal—of the value of the asset 12 before providing vehicle 20 with guarantee 38.

Vehicle 20 preferably then presents guarantee 38, received from insurer 36, to a credit rating agency 25, and in the absence of any liabilities beyond the obligation to pay premiums 40 to insurer 36, vehicle 20 preferably obtains an investment grade credit rating 22 from credit rating agency 25. In reliance upon investment grade credit rating 22, vehicle 20 preferably obtains from a lender 44 a line of credit preferably equivalent to the realizable net cash value of the asset 12.

Except as otherwise noted below, the remainder of the description of arrangement 200 may also apply to arrangement 100. For example, even an entity with an excellent credit rating may have no investment expertise to speak of. Also, there is no reason why even a large financial institution operating according to the present invention could not choose to retain the services of an outside manager as described below.

Vehicle 20 may engage the services of a manager 60 to determine what transaction or transactions to which vehicle 20 should commit. Manager 60 preferably acts as the agent of vehicle 20 to enter into one or more enforceable contracts on behalf of vehicle 20. The relationship of vehicle 20 to manager 60 preferably is governed by an agency contract 52. Contract 52 preferably effectively transfers to manager 60 the right to either pledge underlying asset 12 or commit funds equivalent to the realizable net value of underlying asset 12, either or both as enhanced by investment grade credit rating 22 of vehicle 20. In exchange for the services of manager 60, vehicle 20 preferably agrees to pay management fees 56 to manager 60.

Preferably acting through manager 60, vehicle 20 preferably commits to a transaction 30—which is unrelated to the transaction among owners 10, vehicle 20 and guarantor (or liquidity provider) 36—the value of that commitment 24 preferably not exceeding the realizable net cash value of asset 12. If transaction 30 is profitable, income 26 preferably is generated for vehicle 20. Manager 60 preferably remits that income 26 to vehicle 20 by way of a payment 54. From the amounts paid to the vehicle 20 in payment 54, vehicle 20 preferably pays income 18 to asset owner 10, premiums 40 to insurer 36, any interest 48 that may be owed to lender 44, and management fees 56 to manager 60. Any balance remaining preferably is kept by vehicle 20 as its own profit.

If the outcome of transaction 30 is not as expected and there is a loss, vehicle 20 preferably is obligated to fund the amount of commitment 24. A payment 28 preferably is made by manager 60 directly to cover the loss. That payment 28 preferably is made by manager 60 on behalf of vehicle 20, and at least in arrangement 200 preferably is funded by funds 50 provided to vehicle 20 by lender 44 pursuant to line of credit 22 of vehicle 20. Those funds 50 preferably are forwarded by vehicle 20 to manager 60 by way of a payment 58. Alternatively, there may be a direct payment by lender 44 to manager 60 at the direction of vehicle 20. In arrangement 200, vehicle 20 preferably makes interest payments 48 to lender 44 in exchange for the disbursement of the aforementioned funds 50 by lender 44.

Vehicle 20 preferably makes a call on asset owner 10—i.e., collects from asset owner 10 a payment 14 equal to the funds 50 borrowed from lender 44, plus the amount of any interest payments 48. If asset owner 10 cannot make payment 14, vehicle 20 preferably can liquidate asset 12 that underlies assignment 16 to vehicle 20. Vehicle 20 preferably has the right to liquidate asset 12 as a result of the terms of assignment 16 as well as a right to the proceeds in an amount sufficient to fund any necessary payment 14 to vehicle 20. Should the value of asset 12 be insufficient to cover the loss, lender 44 might have recourse to insurer 36 pursuant to the policy in order to make up the difference.

Alternatively, vehicle 20 may arrange for asset owner 10 to borrow funds 42 from lender 44 to satisfy the obligation of asset owner 10 obligation to make payment 14 to vehicle 20. In that case, lender 44 preferably disburses the borrowed funds 42 (in an amount equal to what is required by payment 14) directly to vehicle 20 in lieu of asset owner 10 making payment 14 directly to vehicle 20. Also, in this alternative configuration of arrangement 100 or 200, asset owner 10 is responsible to make to lender 44 a repayment 46 of interest and principal on the loan, in exchange for lender 44 disbursing funds 42.

As in the case of FIG. 1, for purposes of clarity, arrangement 100 as depicted in FIG. 1 involves only one asset 12 owned by one asset owner 10, securing one transaction 30. However, this embodiment of the invention may operate with a plurality of assets, asset owners, asset manager, insurers, lenders and/or transactions.

In an alternative embodiment (not shown) of either preferred embodiment of the invention, there may be an entity (not shown) administering arrangement 100 or 200. That entity preferably has control of vehicle 20, and may also monitor and evaluate the risk and return of the various choices by manager 60 of transactions 30 to which to make commitments 24 on behalf of vehicle 20. The results of that monitoring and evaluation may be made available to asset owners 10. In this alternative embodiment, the entity administering arrangement 100 or 200 may also track the income and losses generated for asset owners 10 as a result of transactions 30, create a mechanism for the timely distribution of income 18 deriving from those transactions 30, and notify asset owners 10 to request and coordinate payments 14 necessitated by losses as well as any necessary liquidations of the pledged assets 12.

In any embodiment of the invention involving a plurality of assets 12, asset owners 10 and transactions 30, the entity administering arrangement 100 or 200 may establish a system to advertise, market and promote the participation of asset owners 10 in arrangement 100 or 200.

The types of assets 12 of which the present invention can be used include, but are not limited to, relatively illiquid assets such as real estate, life insurance contracts, pension benefits, annuity contracts, a beneficiary's interest in trust funds, funds held in an individual retirement account, restricted securities, lease income, royalties, artwork and and other personal property, as well as relatively liquid assets such as stocks, bonds, or futures contracts in traded commodities. Similarly, those assets 12 could be committed to a variety of different kinds of transactions, with vehicle 20 being able to participate in virtually any type of financial transaction in which asset owner 10 could participate.

As discussed above, it may be that characteristics of vehicle 20 itself allow vehicle 20 to obtain an investment grade credit rating without resorting to an external insurer 36. Where an external insurer 36 is used, insurer 36 preferably is an entity operating at arm's length from vehicle 20. However, insurer 36 also may be an entity affiliated with vehicle 20.

Similarly, if a lender 44 is used, lender 44 preferably is an entity operating at arm's length from vehicle 20, but also may be an entity affiliated with vehicle 20. Alternatively, the function of lender 44 may be performed by vehicle 20 itself, by virtue of vehicle 20 having sufficient funds—e.g., from profits from either previous transactions, or unrelated endeavors (where vehicle 20 has such endeavors as discussed above, such as the case in which vehicle 20 is a bank)—to fund any necessary payment 58 without resorting to an external lender.

Also similarly, if a manager 60 is used, manager 60 preferably is an entity operating at arm's length from vehicle 20, but also may be an entity affiliated with vehicle 20. Alternatively, the function of manager 60 may be performed by vehicle 20 itself by virtue of vehicle 20 (or personnel in vehicle 20) having sufficient expertise to evaluate and decide to which transactions 30 to commit, without resorting to an external manager.

As discussed above, both arrangement 100 of FIG. 1 and arrangement 200 of FIG. 2 are shown with only one asset 10 and one asset owner 12, but the present invention can be used—in arrangement 100, arrangement 200 or some other arrangement—with a plurality of assets 10 and asset owners 12. In such a case, involving a plurality of assets 10 and asset owners 12, asset owners 12 may be divided into two (or more) classes, with a first class of asset owners 12 agreeing to be primarily responsible to fund any payments 28 (by way of payments 14 or borrowed funds 42) brought about by losses in transactions 30, in exchange for that class of asset owners 12 having an entitlement to a larger portion of income 18. The second class of asset owners 12 would receive a smaller portion of income 18 and would be liable to fund payments 28 (by way of payments 14 or borrowed funds 42) only to the extent that the amount of the required payments 28 exceeded the value of the assets pledged into the system by asset owners 12 in the first class. In another such case, involving at least one asset 10 and a plurality of vehicles 20, the asset owner 12 has the option to transfer the right to pledge asset 10 from one vehicle 20 to another. Preferably such transfer would include the guarantee 38 of the asset's value obtained from insurer 36 before the transfer.

Any arrangement according to any embodiment of the invention involving a plurality of assets 10, asset owners 12, and transactions 30 may be arranged so that any individual asset owner 12 and that owner's asset 10 may begin or end participation in the system at any time, upon reasonable notice. Alternatively, either a participant's entry date or exit date, or both, may be restricted. With regard to entry dates, for example, the arrangement may require that asset owners 12 join on fixed dates. With regard to exit dates, for example, the arrangement may require that once an asset owner 12 has joined the arrangement, that asset owner 12 must remain in the arrangement for some predtermined minimum duration—e.g., three years, five years, etc.

In any arrangement according to any embodiment of the invention, an account 21 may be set up within vehicle 20 for each participating asset owner 10 and payments 18 due to asset owner(s) 10 may be accumulated inside vehicle 20 for some period of time before being remitted to asset owner(s) 10. During the period that they are retained, such accumulated funds may be used as an alternate source of funding for any payments 28 made necessary by losses in any transaction 30, as an alternative to payments 14 from asset owner(s) 10 (whether or not borrowed by asset owner(s) 10 from lender 44).

In any embodiment of the present invention, the entity administering that embodiment may establish a system (described below) to provide proof and documentation to asset owners 10, lender 44 (if used) and insurer 36 (if used) regarding the amounts and circumstances surrounding losses in any transaction 30 that would trigger the aforementioned payments 58 and 28. Such a system could also send periodic (e.g., monthly or quarterly) reports to asset owners 10 detailing their profits or losses and the value of their investments (i.e., the assets 10 they have contributed, adjusted for any realized profits or losses), as well as annual statements that may be required to satisfy obligations of asset owners 10 to report profits or losses to governmental taxing authorities.

The entity administering any embodiment of the present invention may establish a system of settling any disputes arising between any two parties including vehicle 20, any asset owner 10, any lender 44 (if used) and any insurer 36 (if used), including disputes between two parties in the same class of parties (e.g., between two owners 10 or between two lenders 44, etc.) regarding their participation in that embodiment of the present invention (such as disputes regarding their respective responsibilities and obligations in connection with payments 18, the pledging 16 of the underlying assets 12, any losses in any transaction 30 giving rise to the aforementioned payments 14 and 58, or any other dispute arising out of participation in an embodiment of the present invention). Such a dispute resolution system, for example, may provide for arbitration, including binding arbitration, of disputes.

The present invention may be administered using any of a variety of computer systems—ranging from a modest personal computer (such as one based on the 80X86 series of microprocessors originally developed by Intel Corporation, of Santa Clara, Calif., and currently represented by the Pentium® family of microprocessors and related processors such as the Core™ Duo and Core™ 2 Duo processors) equipped with a spreadsheet and/or database program, to a supercomputer, depending on the number of potential participating asset owners 10 and assets 12.

A computer system for administering the method of the present invention could process applications for participation by asset owners 10. This could include printing application forms for completion by asset owners 10 seeking to participate in vehicle 20, in which case the data from completed applications could then be entered by human operators. Alternatively, the data could be entered by operators based on verbal responses from an applicant, who may appear live at the vehicle's place of business or may call by telephone. Or the system could include access over an external network such as the Internet (or via modem), by which an applicant could complete an application online. As part of the application process, the system could print the necessary documents for completion by an asset owner 10 for pledging an asset 12 and could also be used to record receipt of pledge documents (whether or not printed by the system).

The computer preferably would similarly administer the various transactions 30, preferably keeping track of necessary trades, as well as payments made and received, and preferably would also administer participant accounts 21, keeping track of payments due to or from participating asset owners 10. Account administration preferably would also include sending periodic statements to participating asset owners 10, including statement sent annually (or on some other timetable as required by the relevant taxing authorities) to enable participating asset owners 10 to meet their tax reporting and payment obligations. If external insurers or lenders are involved, the system preferably also would keep track of those relationships (either between the vehicle and the external entity or entities, or between individual asset owners 10 and the external entity or entities) and payments to be made to or from the external entities. In addition, the system preferably would keep track of any open disputes and the status of attempts to resolve those disputes.

Figure 3:
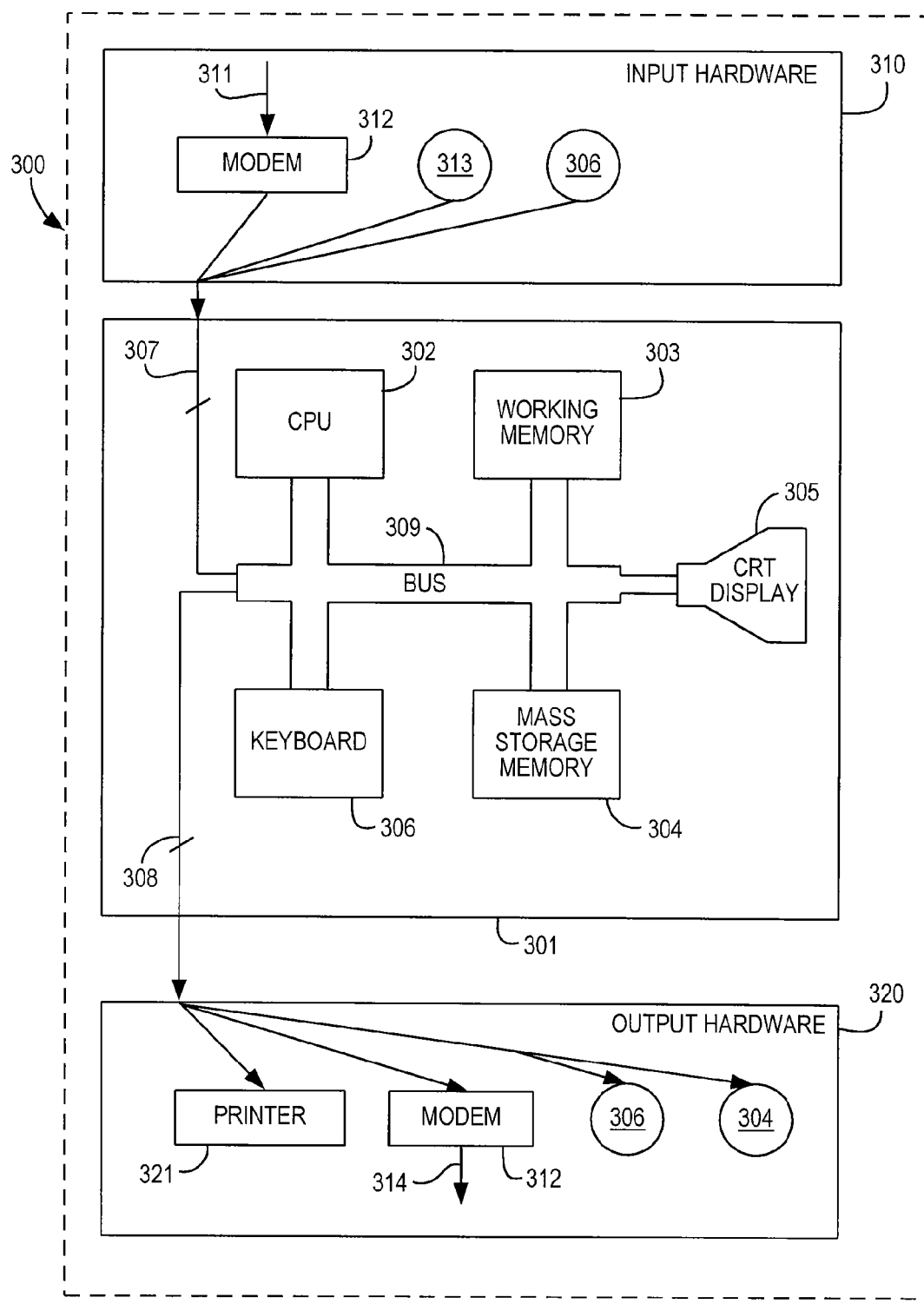
FIG. 3 is a schematic diagram of a first embodiment of a hardware system for implementing the present invention.

An exemplary computer hardware system 300 with which the present invention may be implemented is shown in FIG. 3. System 300 preferably includes a computer 301 comprising a central processing unit ("CPU") 302, a working memory 303 which may be, e.g., RAM (random-access memory) or "core" memory, mass storage memory 304 (such as one or more disk drives or CD-ROM or DVD-ROM drives), one or more display terminals 305 which may be based on cathode-ray tubes ("CRTs") or liquid crystal displays or plasma displays or any other display technology that may be used for computer display terminals, one or more keyboards 306, one or more input lines 307, and one or more output lines 308, all of which are interconnected by a conventional bidirectional system bus 309.

Input hardware 310, coupled to computer 301 by input lines 307, may be implemented in a variety of ways. Market value data and other transaction data may be inputted from an online financial service via the Internet, or dedicated data line 311, or the use of a modem or modems 312 and a conventional telephone line. Alternatively or additionally, input hardware 310 may include CD-ROM or DVD-ROM drives or disk drives 313. In conjunction with display terminal 305, keyboard 306 may also be used as an input device.

Output hardware 320, coupled to computer 301 by output lines 308, may similarly be implemented by conventional devices. By way of example, output hardware 320 may include CRT display terminal 305 for displaying the status of a participating asset owner's account 21 or particular assets 10 in that account 21, payments to be made to or received from participants, that status of any outstanding dispute requiring resolution, or any aspect of operation of the method according to the invention. Output hardware 320 might also include a printer 321, so that hard copy output may be produced, or a disk drive 313, to store system output for later use. Where asset trades are to be executed in connection with a transaction 30, trading information may be transmitted over the Internet or dedicated data lines 314, or possibly by telephone with the use of modem 312, to cause the trades to be executed.

In operation, CPU 302 coordinates the use of the various input and output devices 310, 320, coordinates data accesses from mass storage 304 and accesses to and from working memory 303, and determines the sequence of data processing steps.

Figure 4:
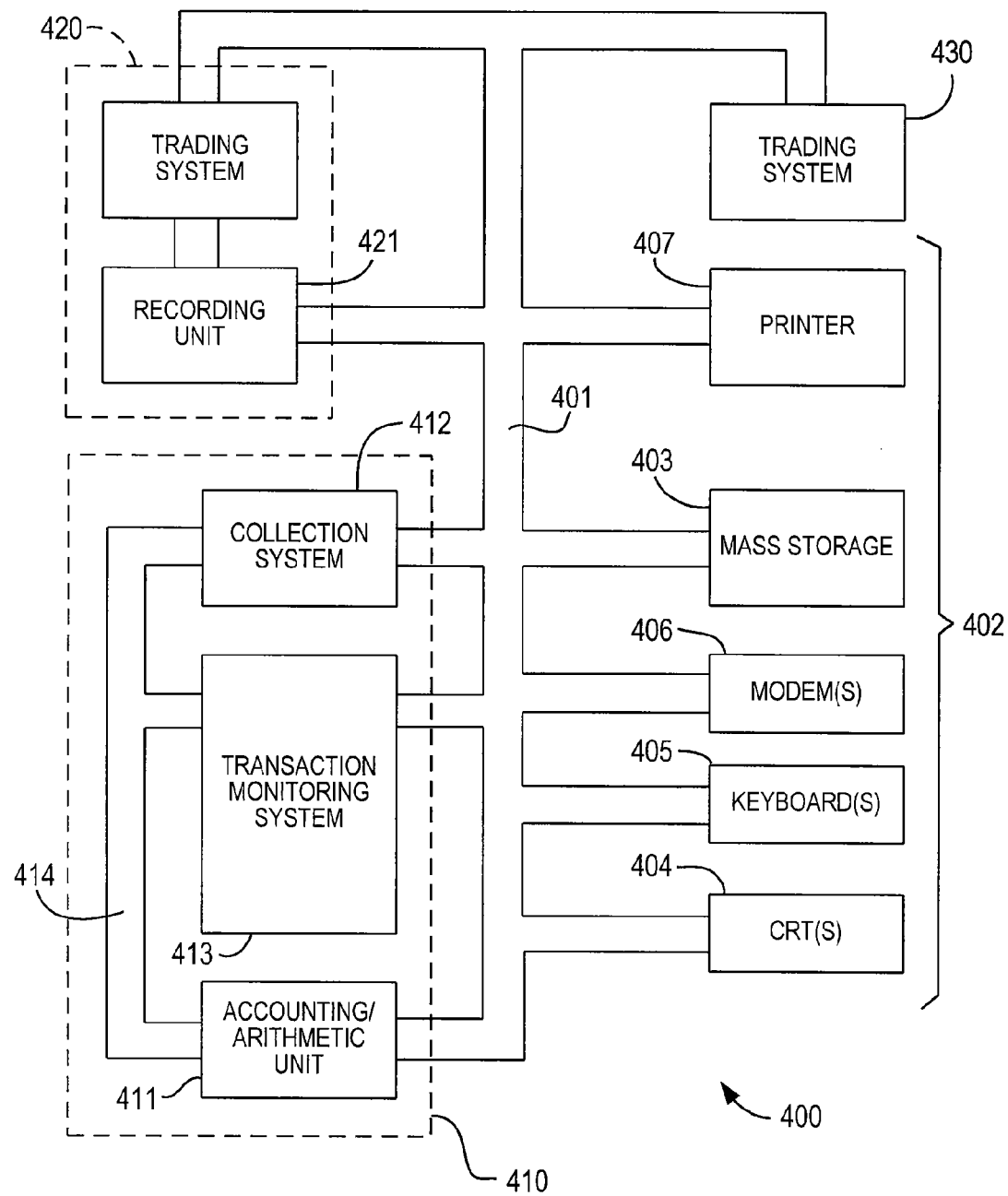
FIG. 4 is a schematic diagram of a second embodiment of a hardware system for implementing the present invention.

In FIG. 4, which shows a second preferred embodiment of apparatus for administering the invention, hardware combination 400 replaces CPU 302 for many of the functions performed in administering the method of the invention. Although a CPU of some kind will still be used for many of the bookkeeping operations of the system (billing, collection, etc.), in the embodiment of FIG. 4 many of the functions are carried out by special purpose hardware. Although some or all of the dedicated hardware modules could be implemented as single-program general purpose microprocessors, they may also be implemented as hard-wired logic (such as appropriately hard-wired gate arrays). As still another alternative, all or part of this hardware combination 400 could be implemented by a programmable logic device ("PLD"), such as those manufactured by Altera Corporation, of San Jose, Calif. One advantage to using a PLD-based hardware system would be the ability to dynamically reconfigure the hardware components.

Apparatus 400 preferably is built around a communications bus 401 similar to bus 309 of FIG. 3. Although not shown in FIG. 4, a CPU similar to CPU 302 may also be included in apparatus 400, connected to bus 401. System 400 also includes input/output devices 402 similar to those in system 300, including one or more mass storage devices 403, one or more CRTs 404, one or more keyboards 405, one or modems 406, and one or more printers 407.

Bookkeeping subsystem 410, whose functions could also be performed by a CPU (not shown) as discussed above, preferably includes an accounting/arithmetic unit 411 for keeping track of the accounts 21 of the various asset owners 10, a collection system 412 for billing asset owners 10 and keeping track of their payments, and transaction monitoring system 413 for monitoring transactions 30. Although each module of subsystem 410 is preferably connected directly to bus 401, at least some of the modules may also be interconnected by local bus 414.

A first trading system 420 preferably secures for the vehicle, from participating asset owners 10, the rights 16 to pledge assets 10. System 420 preferably includes the logic and communications ability (in conjunction with modems 406 available through bus 401) necessary to secure those rights. Preferably, system 420 includes recording unit 421 for recording pledges 16, and releases thereof, in the appropriate public registry, if applicable.

A second trading system 430 preferably handles any aspects of transactions 30 that may involve purchases or sales of securities in the public markets.

Figure 5:
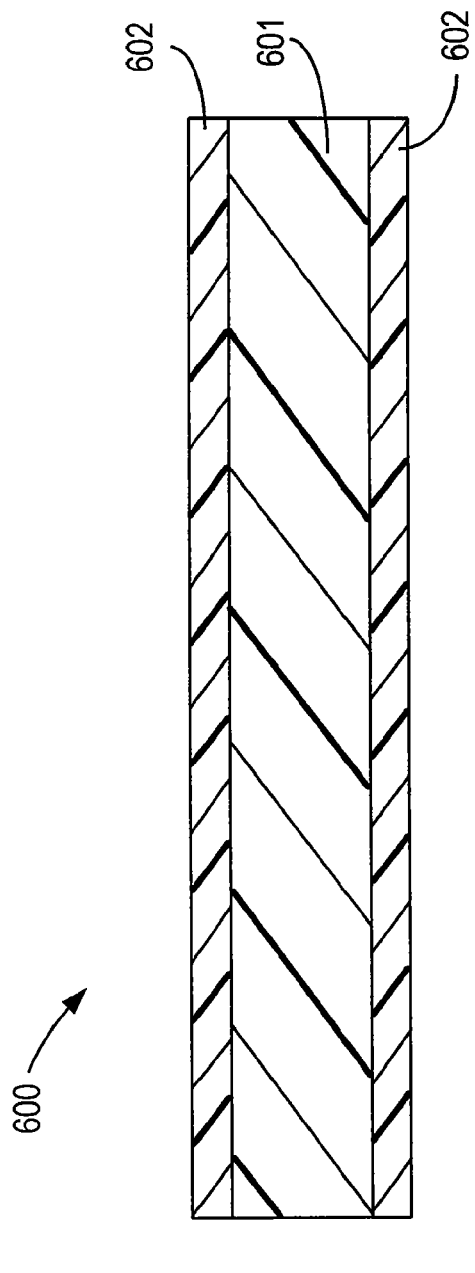
FIG. 5 is a cross-sectional view of a magnetic data storage medium encoded with a set of machine-executable instructions for performing the method according to the present invention.

FIG. 5 presents a cross section of a magnetic data storage medium 600 which can be encoded with a machine executable program that can be carried out by systems such as the aforementioned personal computer, or other computer or similar device to administer the method of the invention. Medium 600 can be a floppy diskette or hard disk, or magnetic tape, having a suitable substrate 601, which may be conventional, and a suitable coating 602, which may be conventional, on one or both sides, containing magnetic domains (not visible) whose polarity or orientation can be altered magnetically. Except in the case where it is magnetic tape, medium 600 may also have an opening (not shown) for receiving the spindle of a disk drive or other data storage device.

The magnetic domains of coating 602 of medium 600 are polarized or oriented so as to encode, in manner which may be conventional, a machine-executable program, for execution by a system such as a personal computer or other computer or similar system, in accordance with the invention.

Figure 6:
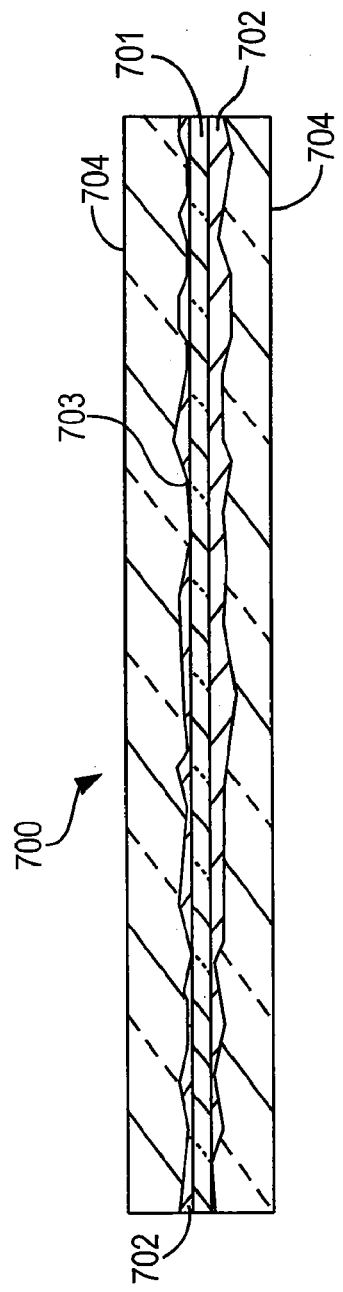
FIG. 6 is a cross-sectional view of an optically readable data storage medium encoded with a set of machine executable instructions for performing the method according to the present invention.

FIG. 6 shows a cross section of an optically-readable data storage medium 700 which also can be encoded with such a machine-executable program, which can be carried out by systems such as the aforementioned personal computer, or other computer or similar device for administering the method of the invention. Medium 700 can be a conventional compact disk read only memory (CD-ROM) or digital video disk read only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 700 preferably has a suitable substrate 701, which may be conventional, and a suitable coating 702, which may be conventional, usually on one or both sides of substrate 701.

In the case of a CD-based or DVD-based medium, as is well known, coating 702 is reflective and is impressed with a plurality of pits 703, arranged on one or more layers, to encode the machine-executable program. The arrangement of pits is read by reflecting laser light off the surface of coating 702. A protective coating 704, which preferably is substantially transparent, is provided on top of coating 702.

In the case of magneto-optical disk, as is well known, coating 702 has no pits 703, but has a plurality of magnetic domains whose polarity or orientation can be changed magnetically when heated above a certain temperature, as by a laser (not shown). The orientation of the domains can be read by measuring the polarization of laser light reflected from coating 702. The arrangement of the domains encodes the program as described above.

The present invention, in any of its embodiments, has many advantages, including providing a mechanism for furnishing an increased return to asset owners on equity in their assets regardless of liquidity, as well as a structure that can use assets belonging to third parties in order to participate in many types of financial transactions. It is understood that that of the advantageous features described herein need not be incorporated into every embodiment of the invention, and certain changes may be made in the foregoing disclosure without departing from the scope of the invention. One skilled in the art will appreciate that the present invention can be practiced by embodiments other than those described herein, which are presented for purposes of illustration and not of limitation, and the present invention is limited only by the claims that follow.

What is claimed is:

1. A method, comprising:
   assigning, using one or more processors, the right to pledge one or more assets, wherein the assignment is made to at least one vehicle by one or more classified asset owners, and wherein each classified asset owner has the option to transfer the right to pledge an asset from a first vehicle to a second vehicle;
   receiving, using the one or more processors, the right to pledge the one or more assets, wherein the right is received by the at least one vehicle from the one or more classified asset owners, wherein each classified asset owner can grant at least one right corresponding to at least one asset, and wherein a classification corresponds to a predefined amount that the asset owner is entitled to or responsible for with respect to the outcome of one or more transactions; and
   pledging, using the one or more processors, the one or more assets to the one or more transactions, wherein pledges are made by the at least one vehicle for the one or more assets, and wherein the one or more transactions can have multiple outcomes, such that:
      when the outcome of a transaction is positive, a return on the transaction is earned, wherein the return is credited to the one or more classified asset owners who granted a right to pledge an asset to the transaction, and in accordance with the amount each asset owner is entitled to with respect to the outcome of the transaction, and
      when the outcome of a transaction is negative, a loss on the transaction is realized, wherein the loss on the transaction is charged to the one or more classified asset owners who granted a right to pledge an asset to the transaction, and in accordance with the amount each asset owner is responsible for with respect to the outcome of the transaction.

2. The method of claim 1, further comprising:
   obtaining a guarantee or insurance corresponding to the value of the one or more assets; and
   using the guarantee or insurance to obtain a credit rating for the at least one vehicle.

3. The method of claim 2, further comprising:
   using the guarantee or the credit rating to borrow from a lender.

4. The method of claim 1, wherein the at least one vehicle has a manager, and wherein the manager performs one or more functions.

5. The method of claim 1, wherein the at least one vehicle obtains a manager, and wherein the manager performs one or more functions.

6. The method of claim 1, wherein an entity monitors and evaluates the risk and return corresponding to pledges made by the at least one vehicle.

7. The method of claim 1, wherein an entity controls the at least one vehicle, and wherein the entity monitors and evaluates the risk and return corresponding to pledges made by the at least one vehicle.

8. The method of claim 1, further comprising:
   using the one or more assets as collateral.

9. The method of claim 1, wherein the at least one vehicle has a credit rating.

10. The method of claim 1, wherein the at least one vehicle has no pre-existing credit characteristics, and wherein the at least one vehicle contracts with an insurer to provide a guarantee of the value of the one or more assets in exchange for the payment of one or more premiums.

11. The method of claim 1, wherein an entity controls the at least one vehicle, and wherein the entity promotes the participation of the one or more classified asset owners.

12. The method of claim 1, wherein the at least one vehicle commits the one or more assets to at least two different transactions.

13. The method of claim 1, wherein the at lest one vehicle is a lender.

14. The method of claim 1, wherein the at least one vehicle is a borrower.

15. The method of claim 1, wherein the right to pledge an asset is associated with one or more dates, and wherein dates include a begin date or an end date.

16. The method of claim 1, wherein each asset is pledged for a predefined period of time.

17. The method of claim 1, wherein the return on the transaction is retained by the at least one vehicle for a period of time, and wherein during that period of time, the return is used to cover loss on a transaction.

18. The method of claim 1, further comprising:
   providing notification of a return or a loss.

19. The method of claim 18, wherein documentation of a loss is provided, and wherein documentation triggers a corresponding payment obligation.

20. The method of claim 1, further comprising:
   generating reports corresponding to the multiple outcomes.

21. The method of claim 1, further comprising:
   using a dispute resolution system.

22. The method of claim 1, further comprising:
   establishing a dispute resolution system, and
   using the dispute resolution system.

23. The method of claim 1, wherein a portion of the return is given to the at least one vehicle.

24. The method of claim 1, wherein a portion of the loss is absorbed by the at least one vehicle.

25. The method of claim 1, wherein the at least one vehicle has a separate business.

26. The method of claim 1, wherein when there is a loss, the at least one vehicle funds the loss, and subsequently collects from the one or more classified asset owners.

27. The method of claim 1, wherein the at least one vehicle has or obtains a manager, and wherein when there is a loss, the manager funds the loss.

28. The method of claim 1, wherein when there is a loss, the at least one vehicle arranges for the one or more classified asset owners to borrow funds from a lender to fund the loss.

29. The method of claim 1, wherein when there is a loss, the one or more assets relevant to the loss are liquidated to fund the loss.

30. The method of claim 1, wherein an entity controls the at least one vehicle, and wherein the entity is affiliated with the at least one vehicle.

31. The method of claim 1, wherein an entity controls the at least one vehicle, and wherein the entity is unrelated to the at least one vehicle.

32. A method, comprising:

assigning, using one or more processors, the right to pledge one or more assets, wherein the assignment is made to at least one vehicle by one or more classified asset owners, and wherein each classified asset owner has the option to transfer the right to pledge an asset from a first vehicle to a second vehicle;

receiving, using the one or more processors, the right to pledge the one or more assets, wherein the right is received by the at least one vehicle from the one or more classified asset owners, wherein each classified asset owner can grant at least one right corresponding to at least one asset, and wherein a classification corresponds to a predefined amount that the asset owner is entitled to or responsible for with respect to the outcome of a plurality of transactions; and pledging, using the one or more processors, the one or more assets to the plurality of transactions, wherein pledges are made by the at least one vehicle for the one or more assets, and wherein the plurality of transactions can have multiple outcomes, such that:

when the outcome of a transaction is positive, a return on the transaction is earned, wherein the return is credited to the one or more classified asset owners who granted a right to pledge an asset to the transaction, and in accordance with the amount each asset owner is entitled to with respect to the outcome of the transaction, and when the outcome of a transaction is negative, a loss on the transaction is realized, wherein the loss on the transaction is charged to the one or more classified asset owners who granted a right to pledge an asset used to commit to the transaction, and in accordance with the amount each asset owner is responsible for with respect to the outcome of the transaction.

33. A system, comprising:

one or more processors;

one or more computer-readable storage mediums containing instructions configured to cause the one or more processors to perform operations including:

assigning the right to pledge one or more assets, wherein the assignment is made to at least one vehicle by one or more classified asset owners, and wherein each classified asset owner has the option to transfer the right to pledge an asset from a first vehicle to a second vehicle;

receiving the right to pledge the one or more assets, wherein the right is received by the at least one vehicle from the one or more classified asset owners, wherein each classified asset owner can grant at least one right corresponding to at least one asset, and wherein a classification corresponds to a predefined amount that the asset owner is entitled to or responsible for with respect to the outcome of one or more transactions; and pledging the one or more assets to the one or more transactions, wherein pledges are made by the at least one vehicle for the one or more assets, and wherein the one or more transactions can have multiple outcomes, such that:

when the outcome of a transaction is positive, a return on the transaction is earned, wherein the return is credited to the one or more classified asset owners who granted a right to pledge an asset to the transaction, and in accordance with the amount each asset owner is entitled to with respect to the outcome of the transaction, and when the outcome of a transaction is negative, a loss on the transaction is realized, wherein the loss on the transaction is charged to the one or more classified asset owners who granted a right to pledge an asset to the transaction, and in accordance with the amount each asset owner is responsible for with respect to the outcome of the transaction.

34. A system, comprising:

one or more processors;

one or more computer-readable storage mediums containing instructions configured to cause the one or more processors to perform operations including:

assigning the right to pledge one or more assets, wherein the assignment is made to at least one vehicle by one or more classified asset owners, and wherein each classified asset owner has the option to transfer the right to pledge an asset from a first vehicle to a second vehicle;

receiving the right to pledge the one or more assets, wherein the right is received by the at least one vehicle from the one or more classified asset owners, wherein each classified asset owner can grant at least one right corresponding to at least one asset, and wherein a classification corresponds to a predefined amount that the asset owner is entitled to or responsible for with respect to the outcome of a plurality of transactions; and pledging the one or more assets to the plurality of transactions, wherein pledges are made by the at least one vehicle for the one or more assets, and wherein the plurality of transactions can have multiple outcomes, such that:

when the outcome of a transaction is positive, a return on the transaction is earned, wherein the return is credited to the one or more classified asset owners who granted a right to pledge an asset to the transaction, and in accordance with the amount each asset owner is entitled to with respect to the outcome of the transaction, and when the outcome of a transaction is negative, a loss on the transaction is realized, wherein the loss on the transaction is charged to the one or more classified asset owners who granted a right to pledge an asset to the transaction, and in accordance with the amount each asset owner is responsible for with respect to the outcome of the transaction.

35. A computer-program product, tangibly embodied in a machine-readable storage medium, including instructions operable to cause a data processing apparatus to:

assign the right to pledge one or more assets, wherein the assignment is made to at least one vehicle by one or more classified asset owners, and wherein each classified asset owner has the option to transfer the right to pledge an asset from a first vehicle to a second vehicle;

receive the right to pledge the one or more assets, wherein the right is received by the at least one vehicle from the one or more classified asset owners, wherein each classified asset owner can grant at least one right corresponding to at least one asset, and wherein a classification corresponds to a predefined amount that the asset owner is entitled to or responsible for with respect to the outcome of one or more transactions; and pledge the one or more assets to the one or more transactions, wherein pledges are made by the at least one vehicle for the one or more assets, and wherein the one or more transactions can have multiple outcomes, such that:

when the outcome of a transaction is positive, a return on the transaction is earned, wherein the return is credited to the one or more classified asset owners who granted a right to pledge an asset to the transaction, and in accordance with the amount each asset owner is entitled to with respect to the outcome of the transaction, and when the outcome of a transaction is negative, a loss on the transaction is realized, wherein the loss on the transaction is charged to the one or more classified asset owners who granted a right to pledge an asset to the transaction, and in accordance with the amount each asset owner is responsible for with respect to the outcome of the transaction.

36. A computer-program product, tangibly embodied in a machine-readable storage medium, including instructions operable to cause a data processing apparatus to:

assign the right to pledge one or more assets, wherein the assignment is made to at least one vehicle by one or more classified asset owners, and wherein each classified asset owner has the option to transfer the right to pledge an asset from a first vehicle to a second vehicle;

receive the right to pledge the one or more assets, wherein the right is received by the at least one vehicle from the one or more classified asset owners, wherein each classified asset owner can grant at least one right corresponding to at least one asset, and wherein a classification corresponds to a predefined amount that the asset owner is entitled to or responsible for with respect to the outcome of a plurality of transactions; and pledge the one or more assets to the plurality of transactions, wherein pledges are made by the at least one vehicle for the one or more assets, and wherein the plurality of transactions can have multiple outcomes, such that:

when the outcome of a transaction is positive, a return on the transaction is earned, wherein the return is credited to the one or more classified asset owners who granted a right to pledge an asset to the transaction, and in accordance with the amount each asset owner is entitled to with respect to the outcome of the transaction, and when the outcome of a transaction is negative, a loss on the transaction is realized, wherein the loss on the transaction is charged to the one or more classified asset owners who granted a right to pledge an asset to the transaction, and in accordance with the amount each asset owner is responsible for with respect to the outcome of the transaction.

* * * * *